US011194037B2

(12) United States Patent
Chen et al.

(10) Patent No.: US 11,194,037 B2
(45) Date of Patent: Dec. 7, 2021

(54) DOPPLER MOTION SENSOR DEVICE WITH HIGH ISOLATION BETWEEN ANTENNAS WITHOUT INCREASING DEVICE SIZE

(71) Applicant: RichWave Technology Corp., Taipei (TW)

(72) Inventors: Tse-Peng Chen, Taipei (TW); You-Chieh Chen, Taipei (TW); Shih-Kai Lin, Taipei (TW)

(73) Assignee: RichWave Technology Corp., Taipei (TW)

( * ) Notice: Subject to any disclaimer, the term of this patent is extended or adjusted under 35 U.S.C. 154(b) by 392 days.

(21) Appl. No.: 16/408,358

(22) Filed: May 9, 2019

(65) Prior Publication Data

US 2019/0346549 A1 Nov. 14, 2019

Related U.S. Application Data

(60) Provisional application No. 62/669,390, filed on May 10, 2018.

(51) Int. Cl.
*G01S 13/88* (2006.01)
*G01S 7/03* (2006.01)
(Continued)

(52) U.S. Cl.
CPC .............. *G01S 13/88* (2013.01); *G01S 7/023* (2013.01); *G01S 7/03* (2013.01); *G01S 13/003* (2013.01);
(Continued)

(58) Field of Classification Search
CPC .. G01V 8/20; G01S 13/56; G01S 7/03; G01S 13/931; G01S 7/023; G01S 7/032;
(Continued)

(56) References Cited

U.S. PATENT DOCUMENTS 5,262,783 A * 11/1993 Philpott ............... H01Q 9/0457
342/28
5,977,874 A * 11/1999 Konstandelos ......... G01S 7/032
333/120
(Continued)

FOREIGN PATENT DOCUMENTS

EP       1 804 335 A1       7/2007
KR    20140087472 A   *   7/2014  ............. G01S 7/032
(Continued)

*Primary Examiner* — Olumide Ajibade Akonai
(74) *Attorney, Agent, or Firm* — Winston Hsu

(57) ABSTRACT

A Doppler motion sensor device is used for detecting a motion of an object. The Doppler motion sensor device includes a first antenna and a second antenna. The first antenna is used to transmit or receive a first wireless signal. The second antenna is used to transmit or receive a second wireless signal. A first straight line passing through a first feed-in point and a first middle point of the first antenna is orthogonal to a second straight line passing through a second feed-in point and a second middle point of the second antenna. One of the first wireless signal and the second wireless signal is a transmission signal. The transmission signal is reflected by the object to form the other one of the first wireless signal and the second wireless signal.

20 Claims, 13 Drawing Sheets

(51) Int. Cl.
*G01S 7/02* (2006.01)
*G01S 13/00* (2006.01)
*G01V 8/20* (2006.01)
*G01S 13/58* (2006.01)
*G01S 13/56* (2006.01)

(52) U.S. Cl.
CPC ............... *G01S 13/58* (2013.01); *G01V 8/20* (2013.01); *G01S 13/56* (2013.01)

(58) Field of Classification Search
CPC ....... G01S 13/88; G01S 7/415; H01Q 1/3233; H01Q 21/065; H01Q 9/0407; H01Q 21/08; H01Q 21/24; H01Q 21/00; H01Q 23/00; H01Q 9/20; H01Q 25/00; H01Q 21/061; H01Q 21/064; H01Q 1/243
USPC .................................................. 342/104, 175
See application file for complete search history.

(56) References Cited

U.S. PATENT DOCUMENTS

| | | | | |
|---|---|---|---|---|
| 6,437,742 | B1* | 8/2002 | Niesen | G01S 3/02 |
| | | | | 342/418 |
| 9,318,811 | B1 | 4/2016 | Fluhler | |
| 2011/0309973 | A1* | 12/2011 | Barrick | H01Q 7/00 |
| | | | | 342/175 |
| 2015/0323696 | A1* | 11/2015 | Cole | G01V 3/28 |
| | | | | 324/326 |
| 2016/0327644 | A1* | 11/2016 | Pu | G01S 7/026 |
| 2016/0365631 | A1* | 12/2016 | Huang | H01Q 21/12 |
| 2017/0149133 | A1* | 5/2017 | Huang | G01S 13/4463 |

FOREIGN PATENT DOCUMENTS

| | | |
|---|---|---|
| TW | 201445812 A | 12/2014 |
| TW | 201628350 A | 8/2016 |
| TW | 201635643 A | 10/2016 |

* cited by examiner

DOPPLER MOTION SENSOR DEVICE WITH HIGH ISOLATION BETWEEN ANTENNAS WITHOUT INCREASING DEVICE SIZE

CROSS REFERENCE TO RELATED APPLICATION

This application claims priority to provisional Patent Application No. 62/669,390, filed 2018 May 10, and incorporated herein by reference in its entirety.

TECHNICAL FIELD

The disclosure is related to a Doppler motion sensor device, and more particularly, a Doppler motion sensor device with high isolation.

BACKGROUND

When a radar device including a transmission (Tx) antenna and a reception (Rx) antenna is operated, the radar device can transmit signals by the transmission antenna and receive signals by the reception antenna at the same time. The transmitted signals are transmitted for detecting an object, and the received signals are received for analyzing whether the signals transmitted beforehand have been bounced off the surface of an object so as to detect the object accordingly.

Because the transmitted signals and the received signals have substantially the same frequency, and the radar device transmits and receives signals at the same time, the isolation between the transmission antenna and the reception antenna is important. If the isolation is insufficient, the reception antenna will incorrectly receive the signals just transmitted from the transmission antenna.

For increasing the isolation between the transmission antenna and the reception antenna, the two antennas can be separated by a long distance. Furthermore, the transmission antenna and the reception antenna can be coupled to two different ground planes to increase the isolation, and a sensor circuit coupled to the transmission antenna and the reception antenna can be coupled to yet another ground plane to further increase the isolation. The long distance between the two antennas and the plurality of ground planes will lead to an excessive device size, and unwanted power loss will be induced because longer conduction wires will be needed.

SUMMARY

An embodiment provides a Doppler motion sensor device for detecting a motion of an object. The Doppler motion sensor device comprises a first antenna and a second antenna. The first antenna is configured to transmit or receive a first wireless signal, and the first antenna comprises a first middle point and a first feed-in point. The first middle point is at a centroid of the first antenna. The first feed-in point is coupled to a sensor circuit and is configured to access a first internal signal corresponding to the first wireless signal. The second antenna is configured to transmit or receive a second wireless signal, and the second antenna comprises a second middle point and a second feed-in point. The second middle point is at a centroid of the second antenna. The second feed-in point is coupled to the sensor circuit and is configured to access a second internal signal corresponding to the second wireless signal. A first straight line passing through the first feed-in point and the first middle point is orthogonal to a second straight line passing through the second feed-in point and the second middle point. One of the first wireless signal and the second wireless signal is a transmission signal, the transmission signal is reflected by the object to form another one of the first wireless signal and the second wireless signal. The sensor circuit is configured to detect the motion of the object according to at least the first internal signal and the second internal signal, and a frequency of the first wireless signal is similar to a frequency of the second wireless signal.

Another embodiment provides a Doppler motion sensor device for detecting a motion of an object. The Doppler motion sensor device comprises N first antennas and K second antennas. The N first antennas are configured to transmit or receive N first wireless signals. The $n^{th}$ first antenna of the N first antennas is configured to transmit or receive an $n^{th}$ first wireless signal. The $n^{th}$ first antenna comprises an $n^{th}$ first middle point and an $n^{th}$ first feed-in point. The $n^{th}$ first middle point is at a centroid of the $n^{th}$ first antenna. The $n^{th}$ first feed-in point is coupled to a sensor circuit and configured to access an $n^{th}$ first internal signal corresponding to the $n^{th}$ first wireless signal. The K second antennas are configured to transmit or receive K second wireless signals. The $k^{th}$ second antenna of the K second antennas is configured to transmit or receive a $k^{th}$ second wireless signal. The $k^{th}$ second antenna comprises a $k^{th}$ second middle point and a $k^{th}$ second feed-in point. The $k^{th}$ second middle point is at a centroid of the $k^{th}$ second antenna. The $k^{th}$ second feed-in point is coupled to the sensor circuit and configured to access a $k^{th}$ second internal signal corresponding to the $k^{th}$ second wireless signal. The $n^{th}$ first straight line passing through the $n^{th}$ first middle point and the $n^{th}$ first feed-in point is orthogonal to the $k^{th}$ second straight line passing through the $k^{th}$ second middle point and the $k^{th}$ second feed-in point. N first middle points of the N first antennas form a geometric shape. The $k^{th}$ second straight line passes through a centroid of the geometric shape. The sensor circuit is configured to detect the motion of the object according to the N first internal signals and the K second internal signals.

Another embodiment provides a Doppler motion sensor device for detecting a motion of an object. The Doppler motion sensor device includes a first antenna and a second antenna. The first antenna is configured to transmit or receive a first wireless signal and comprises a first middle point and a first feed-in point. The first middle point is at a centroid of the first antenna. The first feed-in point is coupled to a sensor circuit and is configured to access a first internal signal corresponding to the first wireless signal. The second antenna is configured to transmit or receive a second wireless signal and comprises a second middle point and a second feed-in point. The second middle point is at a centroid of the second antenna. The second feed-in point is coupled to the sensor circuit and is configured to access a second internal signal corresponding to the second wireless signal. The first antenna is on a first plane, the second antenna is on a second plane, the first plane and the second plane are orthogonal. One of the first wireless signal and the second wireless signal is a transmission signal. The transmission signal is reflected by the object to form another one of the first wireless signal and the second wireless signal. The sensor circuit is configured to detect the motion of the object according to at least the first internal signal and the second internal signal, and a frequency of the first wireless signal is similar to a frequency of the second wireless signal.

DETAILED DESCRIPTION

Figure 1:
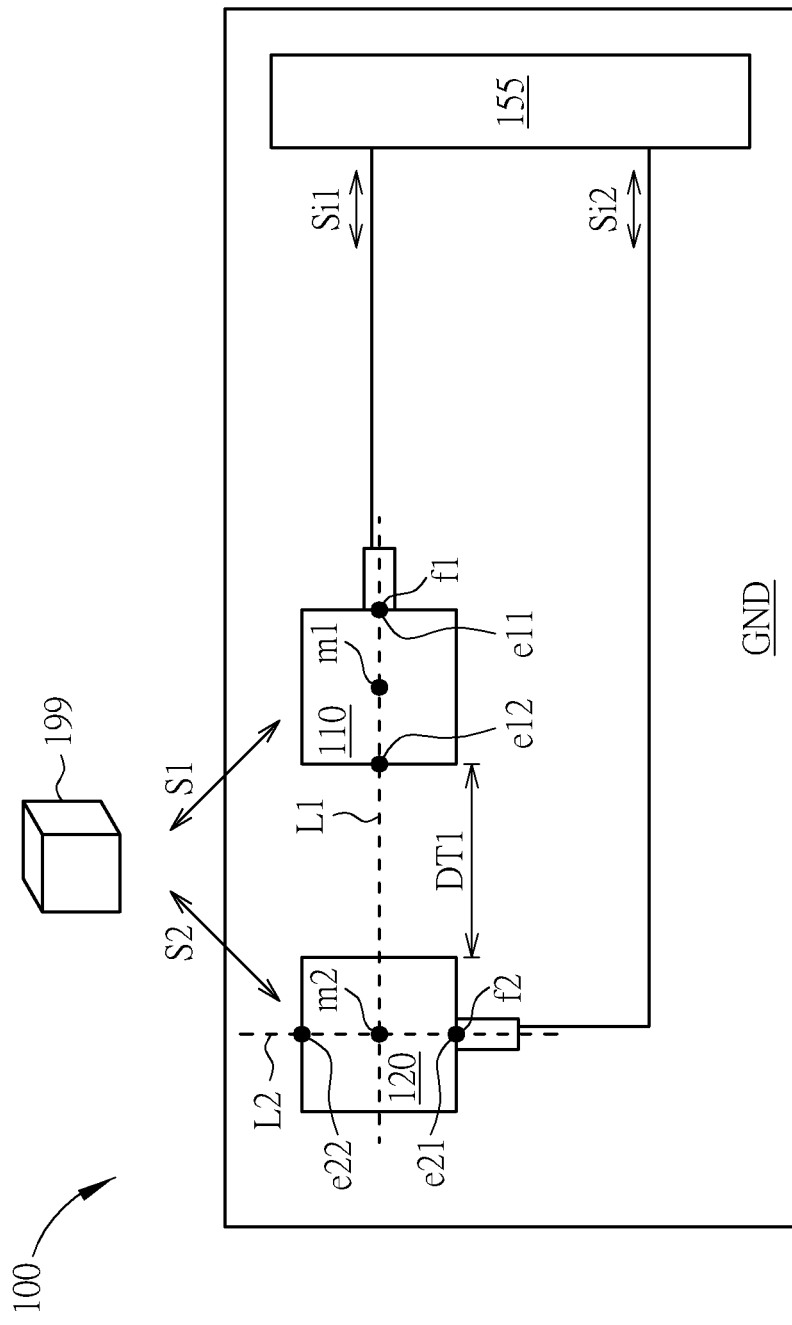
FIG. 1 illustrates a Doppler motion sensor device according to an embodiment.

Below, exemplary embodiments will be described in detail with reference to accompanying drawings so as to be easily realized by a person having ordinary knowledge in the art. The inventive concept maybe embodied in various forms without being limited to the exemplary embodiments set forth herein. Descriptions of well-known parts are omitted for clarity, and like reference numerals refer to like elements throughout.

FIG. 1 illustrates a Doppler motion sensor device 100 according to an embodiment. The embodiment provides a Doppler motion sensor device 100 for detecting the motion of an object 199. The Doppler motion sensor device 100 may include a first antenna 110 and a second antenna 120. The first antenna 110 may be used to transmit or receive a first wireless signal S1. The first antenna 110 may include a first middle point m1 and a first feed-in point f1. The first middle point m1 may be at a centroid of the first antenna 110. The first feed-in point f1 may be coupled to a sensor circuit 155 and be used to access a first internal signal Si1 corresponding to the first wireless signal S1. The second antenna 120 may be used to transmit or receive a second wireless signal S2. The second antenna 120 may include a second middle point m2 and a second feed-in point f2. The second middle point m2 may be at a centroid of the second antenna 120. The second feed-in point f2 maybe coupled to the sensor circuit 155 and be used to access a second internal signal Si2 corresponding to the second wireless signal S2. A first straight line L1 passing through the first feed-in point f1 and the first middle point m1 may be orthogonal to a second straight line L2 passing through the second feed-in point f2 and the second middle point m2. The first straight line L1 may optionally pass through the second middle point m2.

In FIG. 1, one of the first wireless signal S1 and the second wireless signal S2 may be a transmission signal, the transmission signal is reflected by the object 199 to form the other one of the first wireless signal S1 and the second wireless signal S2. The sensor circuit 155 may be used to detect the motion of the object 199 according to at least the first internal signal Si1 and the second internal signal Si2. Hence, the detection may be based on Doppler effect. A frequency of the first wireless signal S1 may be substantially identical to a frequency of the second wireless signal S2. In detail, a frequency of the first wireless signal S1 may be similar to a frequency of the second wireless signal S2, and a tiny frequency shift between the first wireless signal S1 and the second wireless signal S2 could be presented because of Doppler effect. According to the frequency of the used signals, the Doppler motion sensor device may be a microwave (MW) sensor device. In this embodiment, the frequency of the wireless signal S1/S2 transmitted by the corresponding antenna 110/120 could be stable over time.

According to an embodiment, the first antenna 110 of FIG. 1 may be used to transmit the first wireless signal S1, and the second antenna 120 of FIG. 1 may be used to receive the second wireless signal S2 simultaneously. In other words, in this embodiment, the first antenna 110 may be a transmission antenna, and the second antenna 120 may be a reception antenna.

According to another embodiment, the first antenna 110 of FIG. 1 may be used to receive the first wireless signal S1, and the second antenna may be used to transmit the second wireless signal S2 simultaneously. In other words, in this embodiment, the first antenna 110 may be a reception antenna, and the second antenna 120 may be a transmission antenna.

As shown in FIG. 1, according to an embodiment, a common voltage plane GND may be coupled to the first antenna 110 and the second antenna 120 for providing a common voltage. According to an embodiment, the common voltage plane GND may be further coupled to the sensor circuit 155 for providing the common voltage. In one embodiment, the first straight line L1 being orthogonal to the second straight line L2 comprises a projection of the first straight line L1 on a reference surface being orthogonal to a projection of the second straight line L2 on the reference surface. For example, a projection of the first straight line L1 on the common voltage plane GND may be orthogonal to a projection of the second straight line L2 on the common voltage plane GND.

According to an embodiment, wavelengths of the first wireless signal S1 and the second wireless signal S2 may be λ. The first antenna 110 and the second antenna 120 may be separated with a distance DT1. The distance DT1 between the first antenna 110 and the second antenna 120 may be between λ/16 and 3λ. It may be expressed as λ/16≤DT1≤3λ.

According to an embodiment, the first antenna 110 and the second antenna 120 may be formed on an antenna layer. The common voltage plane GND may be formed on a common layer. A substrate may be formed on an insulation layer disposed between the antenna layer and the common layer. The common voltage plane GND may be coupled to the first antenna 110 and the second antenna 120 for providing the common voltage. The mentioned layer may be a physical layer (such as a conductive layer or a metal layer of a printed circuit board) or a non-physical layer of a design. In one embodiment, the common voltage plane GND may be a common ground plane, the common voltage may be a ground voltage, and the common layer may be a ground layer.

Regarding the disposition of the feed-in points, as shown in FIG. 1, the first feed-in point f1 and the second feed-in point f2 may be respectively disposed at an edge point e11 of the first antenna 110 and an edge point e21 of the second antenna 120. However, according to an embodiment, the first feed-in point f1 may be disposed at the edge point e12 which is on the straight line L1 and at a side opposite to the side the edge point e11 is on. The second feed-in point f2 may be disposed at the edge point e22 which is on the straight line L2 and at a side opposite to the side the edge point e21 is on. The relocation of the feed-in points f1, f2 may not affect quality of signals because of the polarizations of the antennas. Likewise, in FIG. 2 to FIG. 10 described below, each feed-in point may be adjusted to be disposed at a suitable edge point at an opposite side.

By setting the antenna 110 and the antenna 120 regarding the feed-in point f1 and the feed-in point f2 with a suitable layout, the polarizations of the antenna 110 and the antenna 120 will lead to sufficient isolation between the antenna 110 and the antenna 120. The two antennas 110 and 120 no longer need to be separated by a long distance. Furthermore, the antenna 110 and the antenna 120 can be coupled to the same common voltage plane without deteriorating the quality of signals. Hence, the problem of prior art may be overcome. Some other embodiments are described below.

Figure 2:
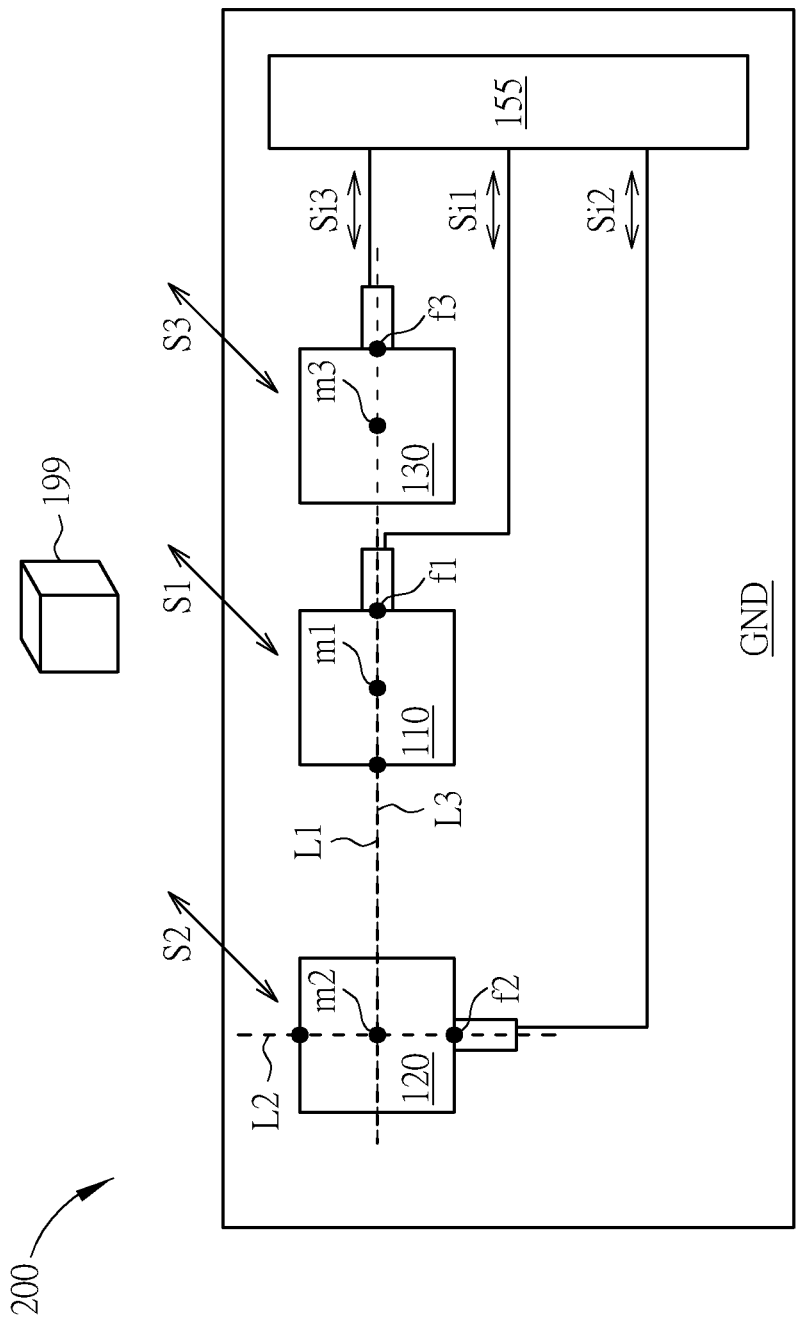
FIG. 2 illustrates a Doppler motion sensor device according to another embodiment.

FIG. 2 illustrates a Doppler motion sensor device 200 according to another embodiment. The Doppler motion sensor device 200 may be used to detect a motion of the object 199 and may include more antennas than that of the Doppler motion sensor device 100 of FIG. 1.

In FIG. 2, the first antenna 110 and the second antenna 120 may be set as shown in FIG. 1. According to an embodiment, the Doppler motion sensor device 200 may include three antennas. The Doppler motion sensor device 200 may further include a third antenna 130 for transmitting or receiving a third wireless signal S3. The third antenna 130 may include a third middle point m3 and a third feed-in point f3. The third middle point m3 may be at a centroid of the third antenna 130. The third feed-in point f3 may be coupled to the sensor circuit 155 for accessing a third internal signal Si3 corresponding to the third wireless signal S3. The first straight line L1 passing through the first feed-in point f1, the first middle point m1, and the second middle point m2 and orthogonal to the second straight line L2 in FIG. 1 may also pass through the third middle point m3 and the third feed-in point f3. The third straight line L3 may pass through the third middle point m3 and the third feed-in point f3.

According to an embodiment, the first antenna 110 may be used to transmit the first wireless signal S1, the second antenna 120 may be used to receive the second wireless signal S2, and the third antenna 130 may be used to transmit the third wireless signal S3 simultaneously. According to another embodiment, the first antenna 110 may be used to receive the first wireless signal S1, the second antenna 120 may be used to transmit the second wireless signal S2, and the third antenna 130 may be used to receive the third wireless signal S3 simultaneously. In FIG. 2, the sensor circuit 155 may be used to analyze the motion of the object 199 by analyzing the internal signals Si1, Si2 and Si3.

Figure 3:
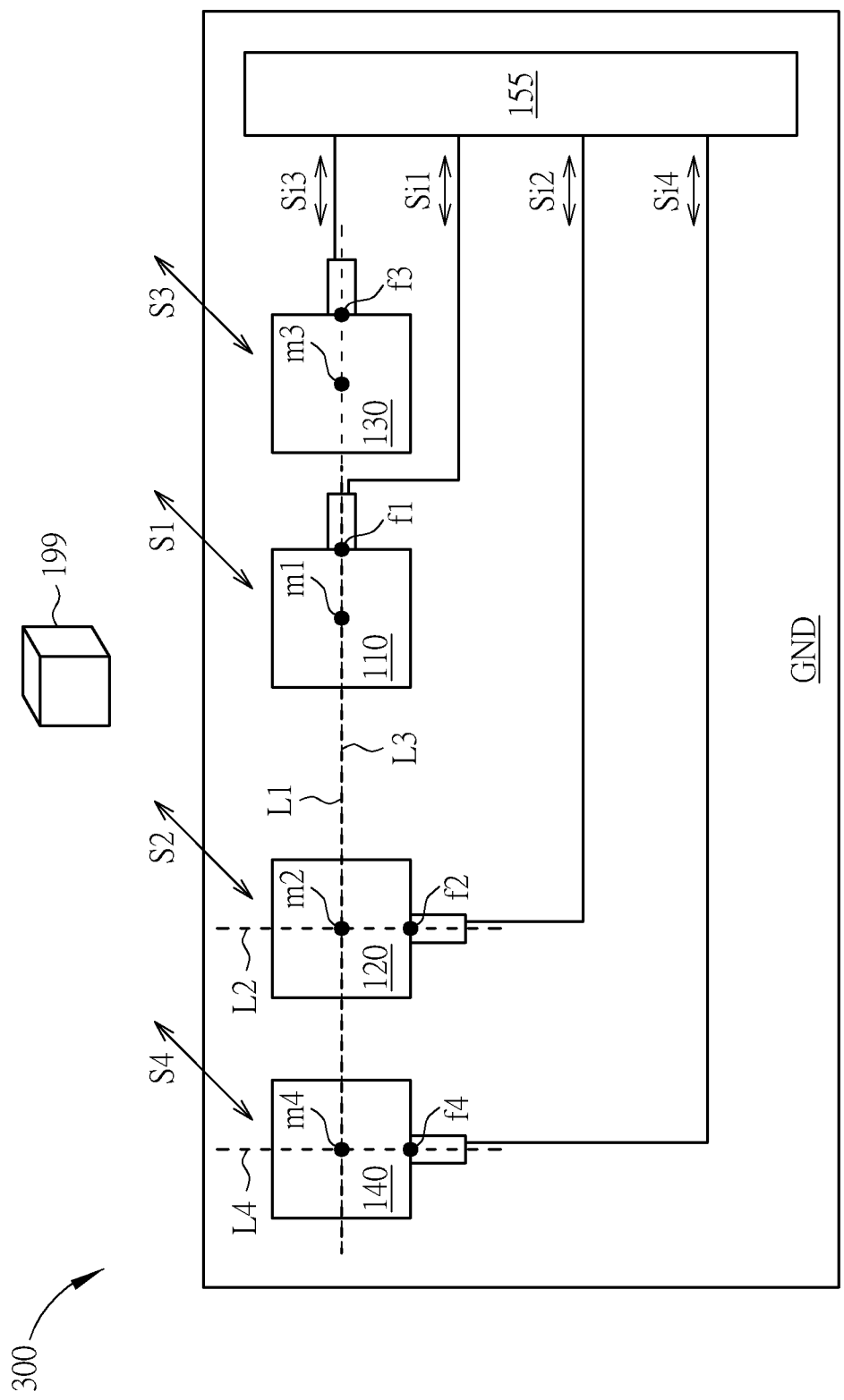
FIG. 3 illustrates a Doppler motion sensor device according to another embodiment.

FIG. 3 illustrates a Doppler motion sensor device 300 according to another embodiment. The Doppler motion sensor device 300 may have more antennas than that of the Doppler motion sensor device 200 of FIG. 2.

As shown in FIG. 3, the Doppler motion sensor device 300 may include four antennas. The Doppler motion sensor device 300 may further include a fourth antenna 140. In FIG. 3, the settings of the antennas 110 to 130 may be similar to that in FIG. 2, so the settings are not repeatedly described. The fourth antenna 140 may be used to transmit or receive a fourth wireless signal S4. The fourth antenna 140 may include a fourth middle point m4 and a fourth feed-in point f4. The fourth middle point m4 may be at a centroid of the fourth antenna 140. The fourth feed-in point f4 maybe coupled to the sensor circuit 155 and for accessing a fourth internal signal Si4 corresponding to the fourth wireless signal S4. The first straight line L1 in FIG. 2 may further pass through the fourth middle point m4 and be orthogonal to a fourth straight line L4 passing through the fourth middle point m4 and the fourth feed-in point f4.

According to an embodiment, in FIG. 3, the first antenna 110 may be used to transmit the first wireless signal S1, the second antenna 120 may be used to receive the second wireless signal S2, the third antenna 130 maybe used to transmit the third wireless signal S3, and the fourth antenna 140 may be used to receive the fourth wireless signal S4 simultaneously. According to another embodiment, in FIG. 3, the first antenna 110 may be used to receive the first wireless signal S1, the second antenna 120 may be used to transmit the second wireless signal S2, the third antenna 130 may be used to receive the third wireless signal S3, and the fourth antenna 140 may be used to transmit the fourth wireless signal S4 simultaneously. In FIG. 3, the sensor circuit 155 may be used to analyze the motion of the object 199 by analyzing the internal signals Si1, Si2, Si3 and Si4.

Figure 4:
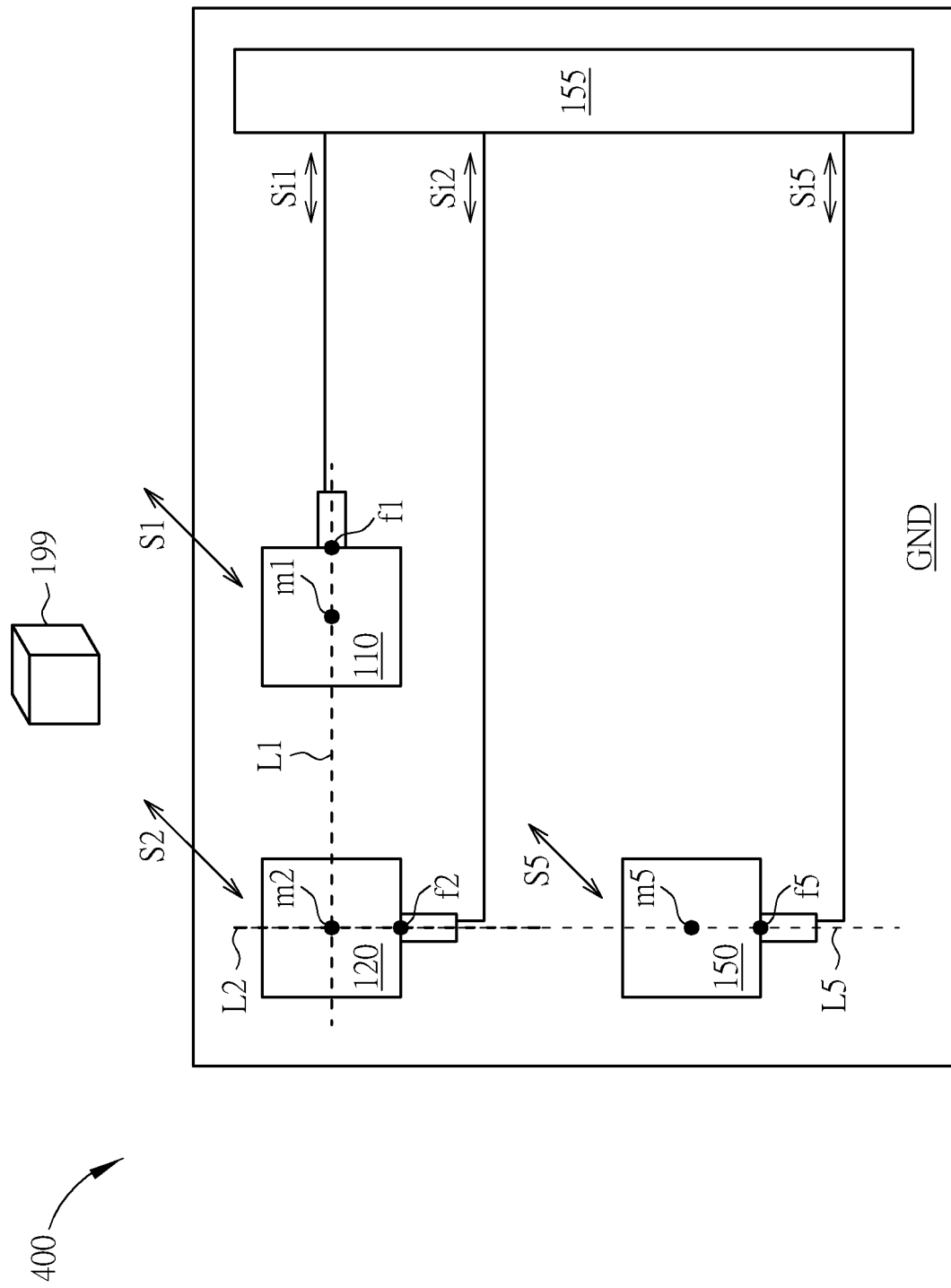
FIG. 4 illustrates a Doppler motion sensor device according to another embodiment.

FIG. 4 illustrates a Doppler motion sensor device 400 according to another embodiment. The Doppler motion sensor device 400 may include the first antenna 110 and the second antenna 120 shown in FIG. 1, so the settings of the first antenna 110 and the second antenna 120 are not repeatedly described. The Doppler motion sensor device 400 may further include a fifth antenna 150 for transmitting or receiving a fifth wireless signal S5. The fifth antenna 150 may include a fifth middle point m5 and a fifth feed-in point f5. The fifth middle point m5 may be at a centroid of the fifth antenna 150. The fifth feed-in point f5 maybe coupled to the sensor circuit 155 for accessing a fifth internal signal Si5 corresponding to the fifth wireless signal S5. A fifth straight line L5 passing through the fifth middle point m5 and the fifth feed-in point f5 may pass through the second middle point m2 and the second feed-in point f2 and is orthogonal to the first straight line L1.

In FIG. 4, according to an embodiment, the first antenna 110 may be used to transmit the first wireless signal S1, the second antenna 120 may be used to receive the second wireless signal S2, and the fifth antenna 150 may be used to receive the fifth wireless signal S5 simultaneously. In FIG. 4, according to another embodiment, the first antenna 110 may be used to receive the first wireless signal S1, the second antenna 120 may be used to transmit the second wireless signal S2, and the fifth antenna 150 may be used to transmit the fifth wireless signal S5 simultaneously.

In FIG. 4, the sensor circuit 155 may be used to analyze the motion of the object 199 by analyzing the internal signals Si1, Si2 and Si5.

Figure 5:
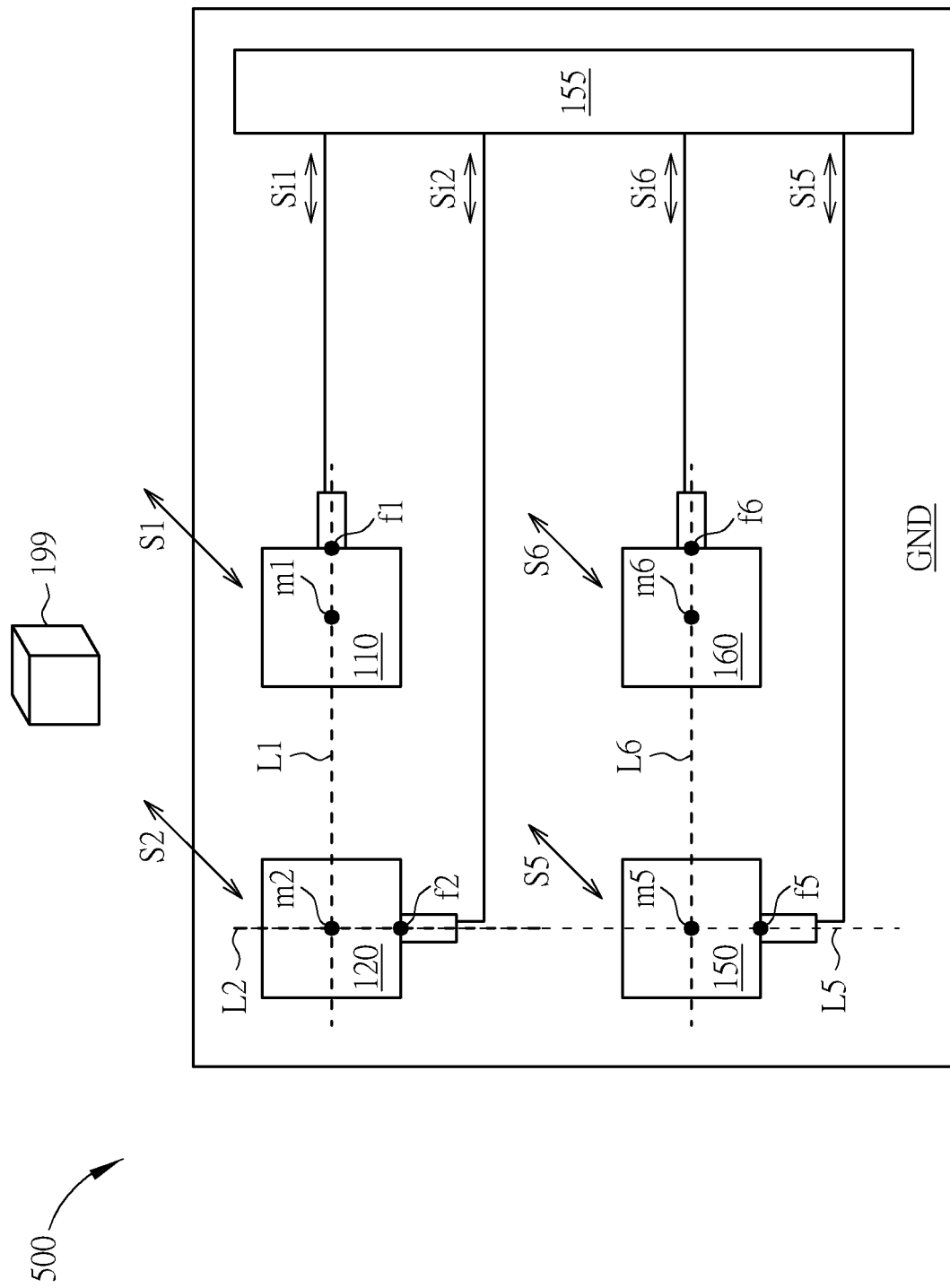
FIG. 5 illustrates a Doppler motion sensor device according to another embodiment.

FIG. 5 illustrates a Doppler motion sensor device 500 according to another embodiment. The Doppler motion sensor device 500 may include the first antenna 110, the second antenna 120 and the fifth antenna 150 of FIG. 4, so the settings of the three antennas 110, 120 and 150 are not repeatedly described. Comparing with FIG. 4, the Doppler motion sensor device 500 in FIG. 5 may further include a sixth antenna 160 for transmitting or receiving a sixth wireless signal S6. The sixth antenna 160 may include a sixth middle point m6 and a sixth feed-in point f6. The sixth middle point m6 may be at a centroid of the sixth antenna 160. The sixth feed-in point f6 may be coupled to the sensor circuit 155 for accessing a sixth internal signal Si6 corresponding to the sixth wireless signal S6. A sixth straight line L6 passing through the sixth middle point m6 and the sixth feed-in point f6 may pass through the fifth middle point m5 and be orthogonal to the fifth straight line L5.

Regarding the directions of the wireless signals in FIG. 5, according to an embodiment, the first antenna 110 may be used to transmit the first wireless signal S1, the second antenna 120 may be used to receive the second wireless signal S2, the fifth antenna 150 may be used to receive the fifth wireless signal S5, and the sixth antenna 160 may be used to transmit the sixth wireless signal S6 simultaneously.

According to another embodiment, in FIG. 5, the first antenna 110 may be used to receive the first wireless signal S1, the second antenna 120 may be used to transmit the second wireless signal S2, the fifth antenna 150 may be used to transmit the fifth wireless signal S5, and the sixth antenna 160 may be used to receive the sixth wireless signal S6 simultaneously.

In FIG. 5, the sensor circuit 155 may be used to analyze the motion of the object 199 by analyzing the internal signals Si1, Si2, Si5 and Si6.

Figure 6:
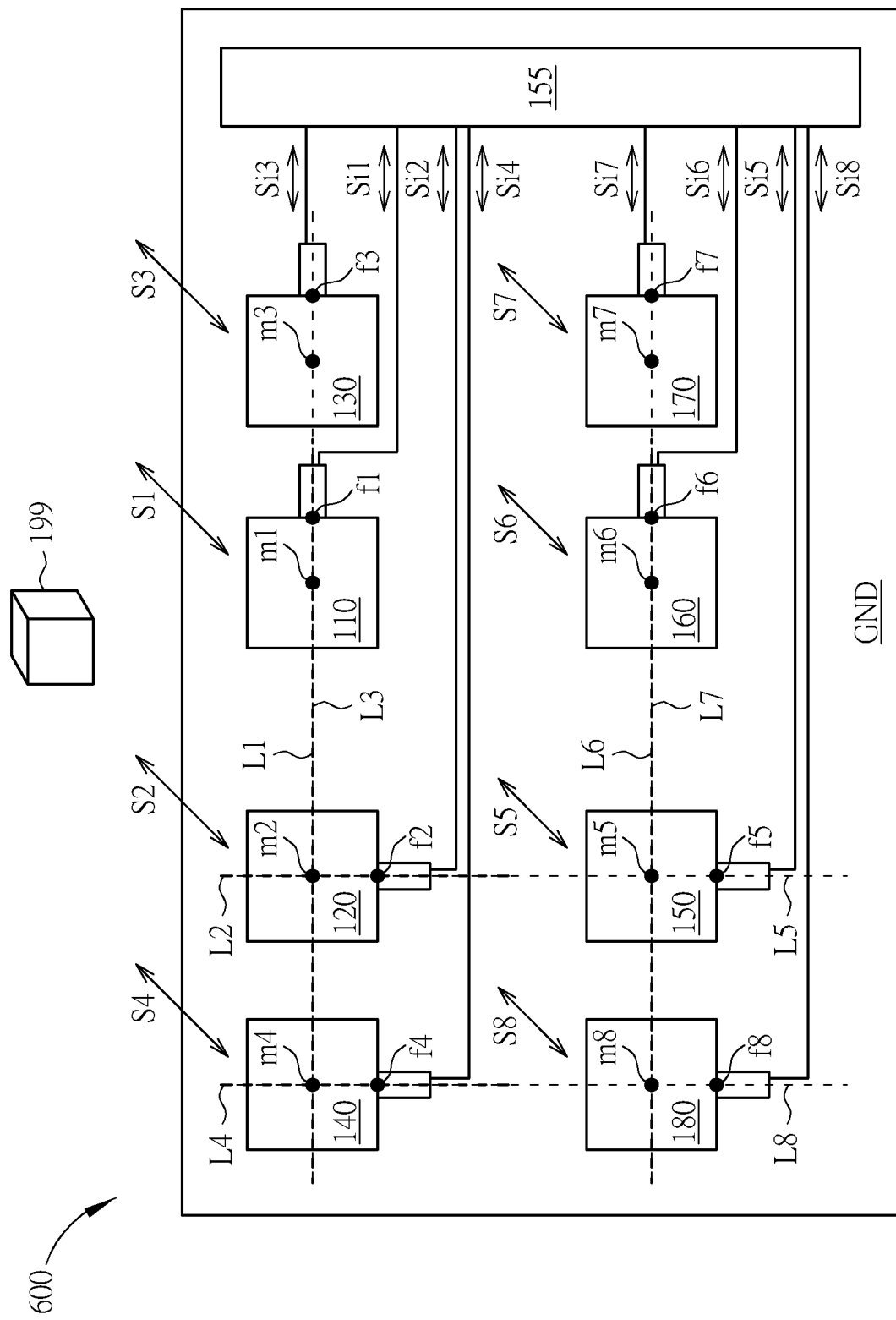
FIG. 6 illustrates a Doppler motion sensor device according to another embodiment.

FIG. 6 illustrates a Doppler motion sensor device 600 according to another embodiment. As shown in FIG. 6, the Doppler motion sensor device 600 may include the first antenna 110 to the sixth antenna 160, a seventh antenna 170 and an eighth antenna 180. The settings of the first antenna 110 to the sixth antenna 160 may be similar to that shown in FIG. 2 to FIG. 5, so they are not repeatedly described. The seventh antenna 170 may be used to transmit or receive a seventh wireless signal S7. The seventh antenna 170 may include a seventh middle point m7 and a seventh feed-in point f7. The seventh middle point m7 may be at a centroid of the seventh antenna 170. The seventh feed-in point f7 may be coupled to the sensor circuit 155 and be used to access a seventh internal signal Si7 corresponding to the seventh wireless signal S7. A seventh straight line L7 passing through the seventh middle point m7 and the seventh feed-in point f7 may pass through the sixth middle point m6 and the fifth middle point m5 and be orthogonal to the fifth straight line L5. The eighth antenna 180 may be used to transmit or receive an eighth wireless signal S8. The eighth antenna 180 may include an eighth middle point m8 and an eighth feed-in point f8. The eighth middle point m8 may be at a centroid of the eighth antenna 180. The eighth feed-in point f8 may be coupled to the sensor circuit 155 and be used to access an eighth internal signal Si8 corresponding to the eighth wireless signal S8. An eighth straight line L8 passing through the eighth middle point m8 and the eighth feed-in point f8 may pass through the fourth middle point m4 and be orthogonal to the first straight line L1.

According to embodiments, as shown in FIG. 6, in FIG. 1 to FIG. 6, because of the layout and settings of the antennas 110 to 180, the straight lines L1 and L3 may overlap or be in parallel with one another, the straight lines L6 and L7 may overlap or be in parallel with one another, the straight lines L4 and L8 may overlap or be in parallel with one another, and the straight lines L2 and L5 may overlap or be in parallel with one another.

Regarding the directions of the signals in FIG. 6, according to an embodiment, the first antenna 110 may be used to transmit the first wireless signal S1. The second antenna 120 maybe used to receive the second wireless signal S2. The third antenna 130 may be used to transmit the third wireless signal S3. The fourth antenna 140 may be used to receive the fourth wireless signal S4. The fifth antenna 150 may be used to receive the fifth wireless signal S5. The sixth antenna 160 may be used to transmit the sixth wireless signal S6. The seventh antenna 170 may be used to transmit the seventh wireless signal S7. The eighth antenna 180 may be used to receive the eighth wireless signal S8.

According to another embodiment, in FIG. 6, the first antenna 110 may be used to receive the first wireless signal S1. The second antenna 120 may be used to transmit the second wireless signal S2. The third antenna 130 may be used to receive the third wireless signal S3. The fourth antenna 140 may be used to transmit the fourth wireless signal S4. The fifth antenna 150 may be used to transmit the fifth wireless signal S5. The sixth antenna 160 may be used to receive the sixth wireless signal S6. The seventh antenna 170 may be used to receive the seventh wireless signal S7. The eighth antenna 150 may be used to transmit the eighth wireless signal S8.

In FIG. 6, the sensor circuit 155 may be used to analyze the motion of the object 199 by analyzing the internal signals Si1, Si2, Si3, Si4, Si5, Si6, Si7 and Si8. The antennas 110~180 may be used to transmit and receive the corresponding wireless signal S1~S8 simultaneously.

Figure 7:
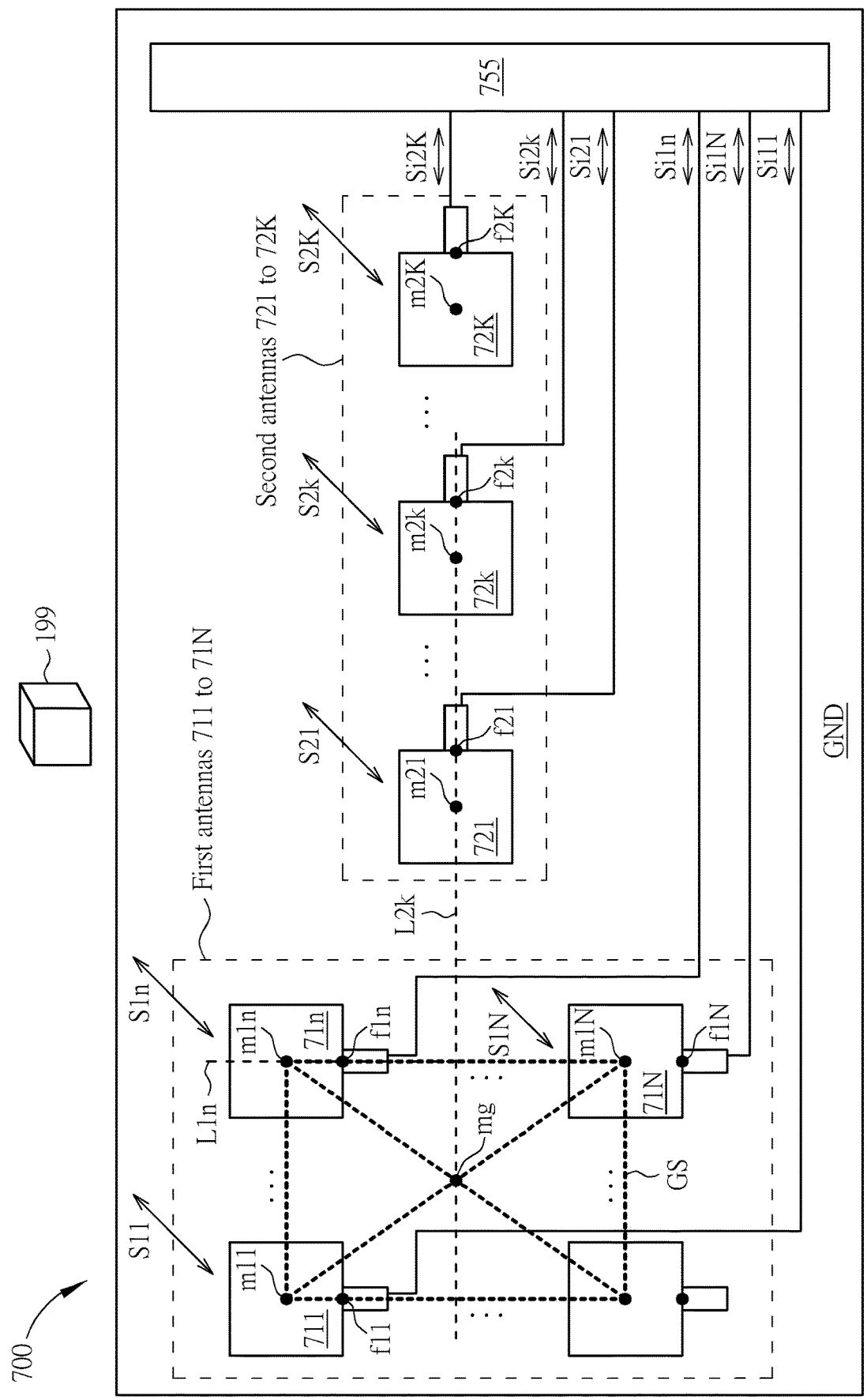
FIG. 7 illustrates a Doppler motion sensor device according to another embodiment.

FIG. 7 illustrates a Doppler motion sensor device 700 according to another embodiment. The Doppler motion sensor device 700 may include N first antennas 711 to 71N and K second antennas 721 to 72K. The N first antennas 711 to 71N may be used to transmit or receive N first wireless signals S11 to S1N. The K second antennas 721 to 72K may be used to transmit or receive K second wireless signals S21 to S2K. The N first antennas and the K second antennas may be used to transmit and receive the corresponding wireless signal simultaneously.

An $n^{th}$ first antenna $71n$ of the N first antennas 711 to 71N may be used to transmit or receive an $n^{th}$ first wireless signal $S1n$. The $n^{th}$ first antenna $71n$ may include an $n^{th}$ first middle point $m1n$ and an $n^{th}$ first feed-in point $f1n$. The $n^{th}$ first middle point $m1n$ may be at a centroid of the $n^{th}$ first antenna $71n$. The $n^{th}$ first feed-in point $f1n$ may be coupled to a sensor circuit 755 for accessing an $n^{th}$ first internal signal $Si1n$ corresponding to the $n^{th}$ first wireless signal $S1n$.

A $k^{th}$ second antenna $72k$ of the K second antennas 721 to 72K may be used transmit or receive a $k^{th}$ second wireless signal $S2k$. The $k^{th}$ second antenna $72k$ may include a $k^{th}$ second middle point $m2k$ and a $k^{th}$ second feed-in point $f2k$. The $k^{th}$ second middle point $m2k$ may be at a centroid of the $k^{th}$ second antenna $72k$. The $k^{th}$ second feed-in point $f2k$ may be coupled to the sensor circuit 755 for accessing a $k^{th}$ second internal signal $Si2k$ corresponding to the $k^{th}$ second wireless signal $S2k$.

An $n^{th}$ first straight line $L1n$ passing through the $n^{th}$ first middle point $m1n$ and the $n^{th}$ first feed-in point $f1n$ may be orthogonal to a $k^{th}$ second straight line $L2k$ passing through the $k^{th}$ second middle point $m2k$ and the $k^{th}$ second feed-in point $f2k$. N first middle points $m11$ to $m1N$ of the N first antennas 711 to 71N may form a geometric shape GS. The $k^{th}$ second straight line $L2k$ may pass through a centroid mg of the geometric shape GS. The sensor circuit 755 may be used to detect the motion of the object 199 according to the N first internal signals $Si11$ to $Si1N$ and the K second internal signals $Si21$ to $Si2K$. The abovementioned variables N, n, K and k are positive integers, $0 < n \leq N$, and $0 < k \leq K$.

Regarding the directions of the signals in FIG. 7, according to an embodiment, the N first antennas 711 to 71N may be used to receive the N first wireless signals S11 to $S1n$ and transmit the N first internal signals Si11 to Si1N to the sensor circuit 755. The K second antennas 721 to 72K may be used to transmit the K second wireless signals S21 to S2K and receive the K second internal signals Si21 to Si2K from the sensor circuit 755. The K second wireless signals S21 to S2K may be reflected by the surface of the object 199 to form the N first wireless signals S11 to S1N.

According to another embodiment, in FIG. 7, the N first antennas 711 to 71N may be used to transmit the N first wireless signals S11 to S1N and receive the N first internal signals Si11 to Si1N from the sensor circuit 755. The K second antennas 721 to 72K may be used to receive the K second wireless signals S21 to S2K and transmit the K second internal signal Si21 to Si2K to the sensor circuit 755. The N first wireless signals S11 to S1N may be reflected by the surface of the object 199 to form the K second wireless signals S21 to S2K.

Figure 8:
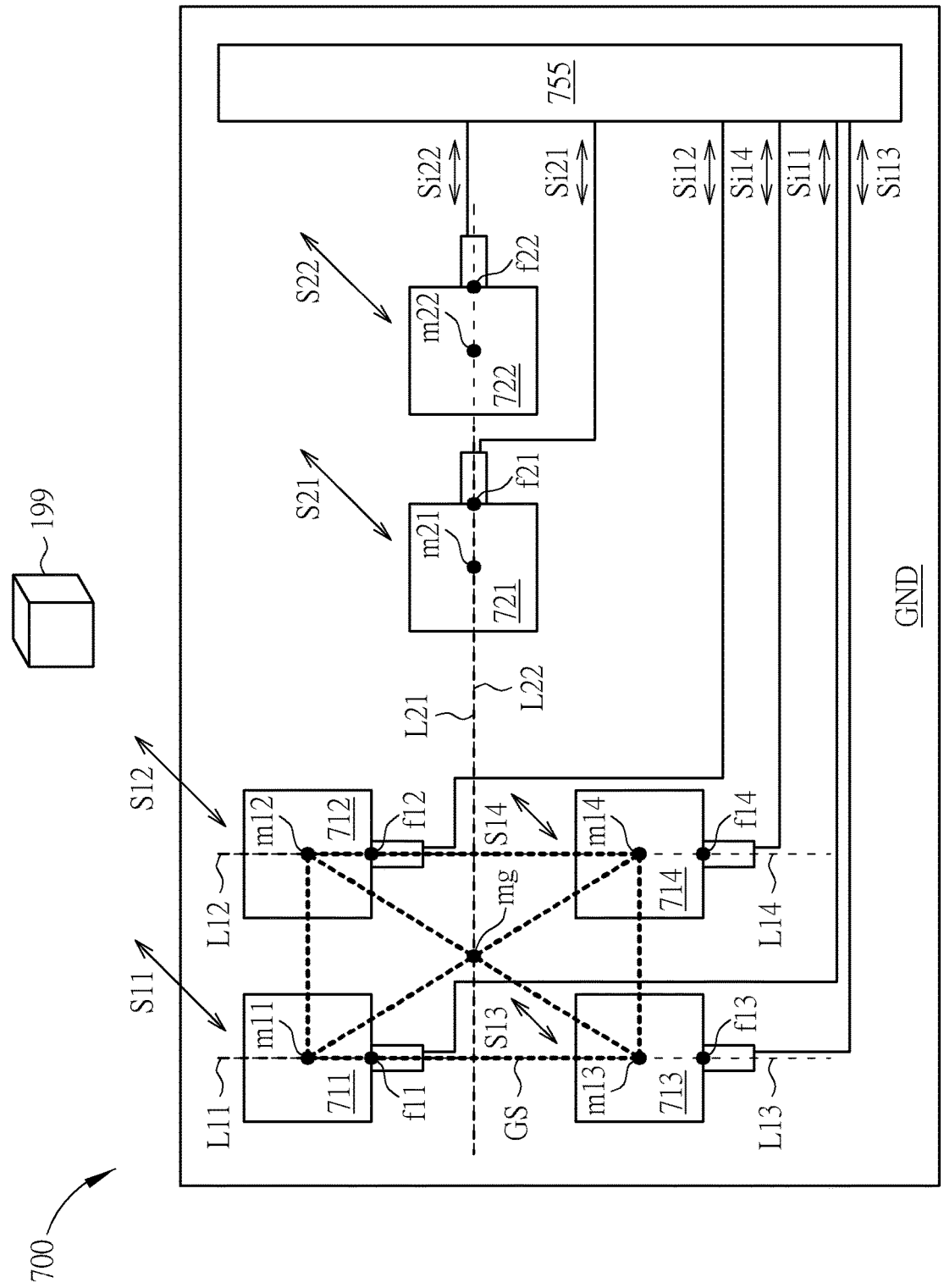
FIG. 8 illustrates the Doppler motion sensor device of FIG. 7 according to an embodiment.

FIG. 8 illustrates the Doppler motion sensor device 700 of FIG. 7 according to an embodiment. FIG. 8 may provide an example where N=4, K=2 and the geometric shape GS may be a rectangular shape.

Figure 9:
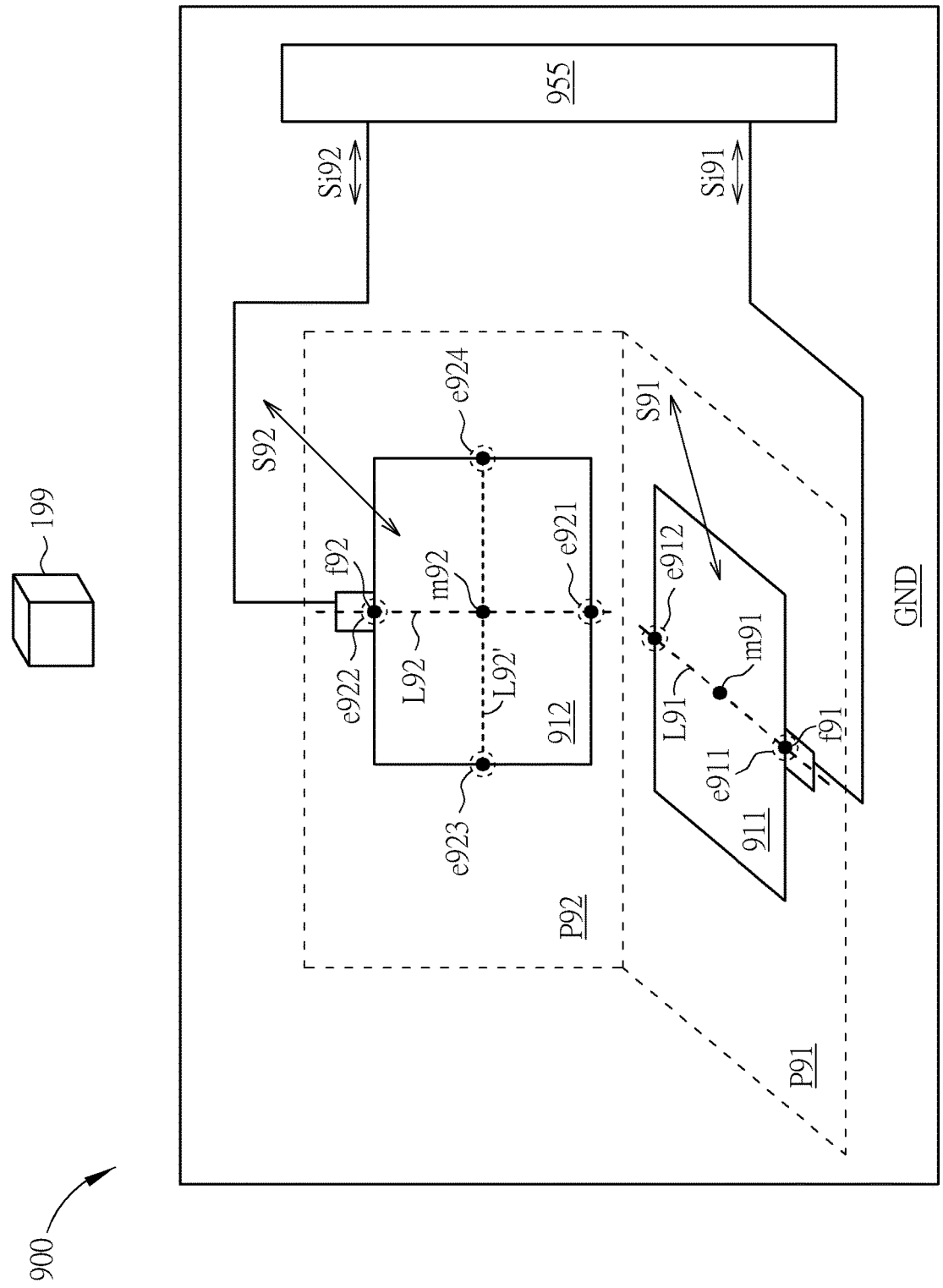
FIG. 9 illustrates a Doppler motion sensor device according to another embodiment.

FIG. 9 illustrates a Doppler motion sensor device 900 according to another embodiment. The Doppler motion sensor device 900 may include a first antenna 911 and a second antenna 912. The first antenna 911 may be used to transmit or receive a first wireless signal S91. The first antenna 911 may include a first middle point m91 and a first feed-in point f91, where the first middle point m91 may be at a centroid of the first antenna 911, and the first feed-in point f91 may be coupled to a sensor circuit 955 for accessing a first internal signal Si91 corresponding to the first wireless signal S91. The second antenna 912 may be used to transmit or receive a second wireless signal S92. The second antenna 912 may include a second middle point m92 and a second feed-in point f92, where the second middle point m92 may be at a centroid of the second antenna 912, and the second feed-in point f91 may be coupled to the sensor circuit 955 for accessing a second internal signal Si92 corresponding to the second wireless signal S92. The antennas 911 and 912 may be used to transmit and receive the corresponding wireless signal S91 and S92 simultaneously.

As shown in FIG. 9, the first antenna 911 may be on a first plane P91. The second antenna 912 may be on a second plane P92. The first plane P91 and the second plane P92 may be orthogonal to one another. One of the first wireless signal S91 and the second wireless signal S92 may be a transmission signal, where the transmission signal may be reflected by the surface of the object 199 to form another one of the first wireless signal S91 and the second wireless signal S92. In other words, regarding the directions of the signals, one of the signals S91 and S92 is a transmission signal, and the other one is a receiving signal. The sensor circuit 955 may be used to detect the motion of the object 199 according to at least the first internal signal Si91 and the second internal signal Si92. A frequency of the first wireless signal S91 may be similar to a frequency of the second wireless signal S92.

According to an embodiment, as shown in FIG. 9, the first antenna 911 may include a first edge point e911 and a second edge point e912 opposite to the first edge point e911. A first straight line L91 passing through the first edge point e911 and the second edge point e912 of the first antenna 911 may pass through the first middle point m91. The second antenna 912 may include a first edge point e921 and a second edge point e922 opposite to the first edge point e921. A second straight line L92 passing through the first edge point e921 and the second edge point e922 may be orthogonal to the first straight line L91 and normal to the first plane P91, and pass through the second middle point m92. The first feed-in point f91 may be disposed at the first edge point e911 or the second edge point e912 of the first antenna 911. The second feed-in point f92 may be disposed at the first edge point e921 or the second edge point e922 of the second antenna 912.

As shown in FIG. 9, the second antenna 912 may further include a third edge point e923 and a fourth edge point e924 opposite to the third edge point e923. A straight line L92' passing through the third edge point e923 and the fourth edge point e924 may be orthogonal to the second straight line L92. According to another embodiment, when merely the antennas 911 and 912 are regarded, the second feed-in point f92 may be disposed at one of the first edge point e921, the second edge point e922, the third edge point e923 and the fourth edge point e924.

Figure 10:
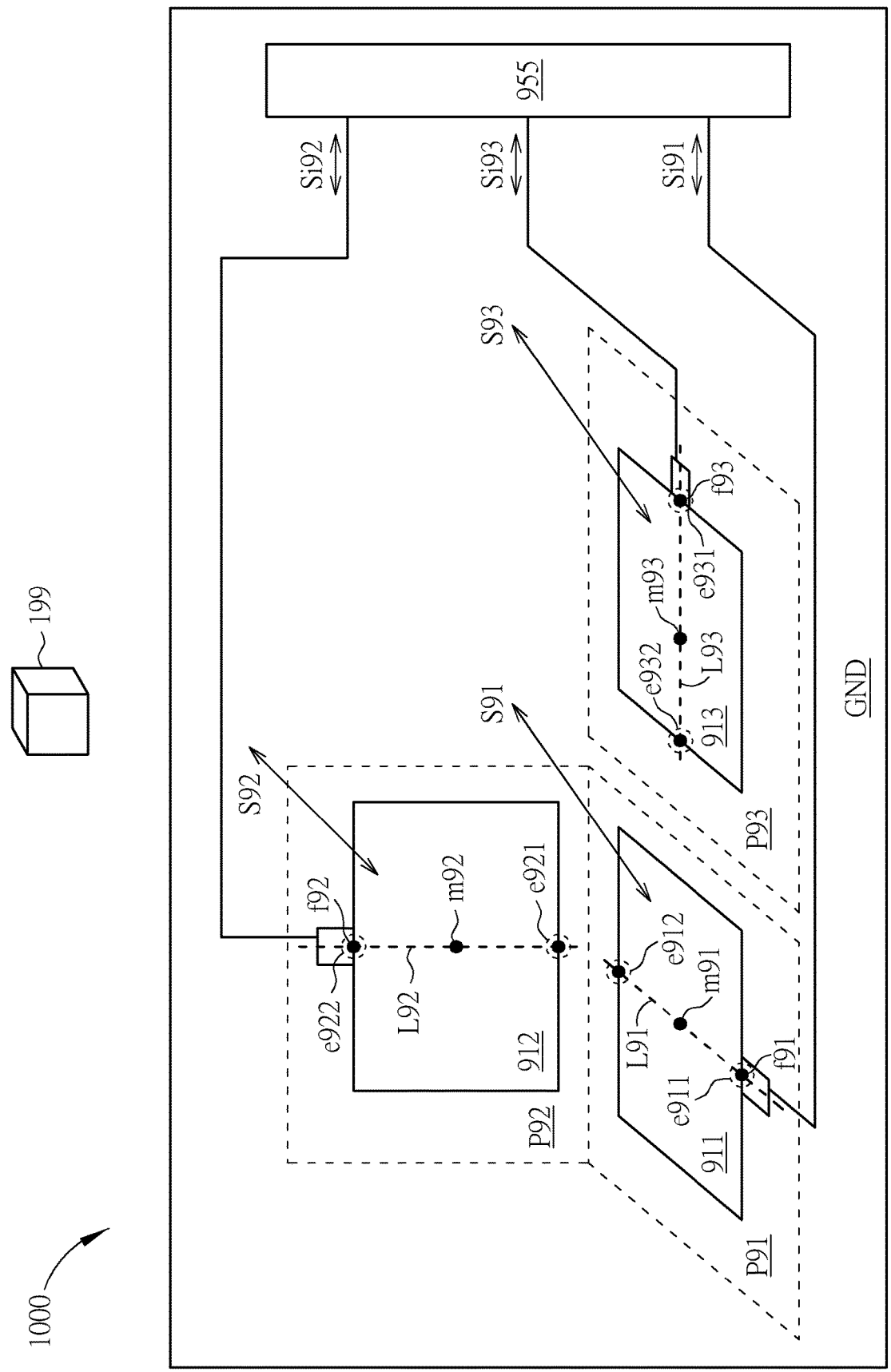
FIG. 10 illustrates a Doppler motion sensor device according to another embodiment.

FIG. 10 illustrates a Doppler motion sensor device 1000 according to another embodiment. The Doppler motion sensor device 1000 may include the first antenna 911 and the second antenna 912 shown in FIG. 9, and further include a third antenna 913. The third antenna 913 may be used to transmit or receive a third wireless signal S93 and include a third middle point m93 and a third feed-in point f93. The third middle point m93 may be at a centroid of the third antenna 913. The third feed-in point f93 may be coupled to the sensor circuit 955 for accessing a third internal signal Si93 corresponding to the third wireless signal S93. The third antenna 913 may be on a third plane P93. The third plane P93 may be orthogonal to the second plane P92. The first plane P91 and the third plane P93 may be coplanar or in parallel with one another. The antennas 911~913 may be used to transmit and receive the corresponding wireless signal S91~S93 simultaneously.

According to an embodiment, in FIG. 10, The third antenna 913 may include a first edge point e931 and a second edge point e932 opposite to the first edge point e931. A third straight line L93 passing through the first edge point e931 and the second edge point e932 of the third antenna 913 maybe orthogonal to the first straight line L91 and the second straight line L92, and may pass through the third middle point m93. In order to increase the isolation among the three antennas 911, 912, 913, the first feed-in point f91 may be disposed at the first edge point e911 or the second edge point e912 of the first antenna 911. The second feed-in point f92 maybe disposed at the first edge point e921 or the second edge point e922 of the second antenna 912. The third feed-in point f93 may be disposed at the first edge point e931 or the second edge point e932 of the third antenna 913.

Figure 11:
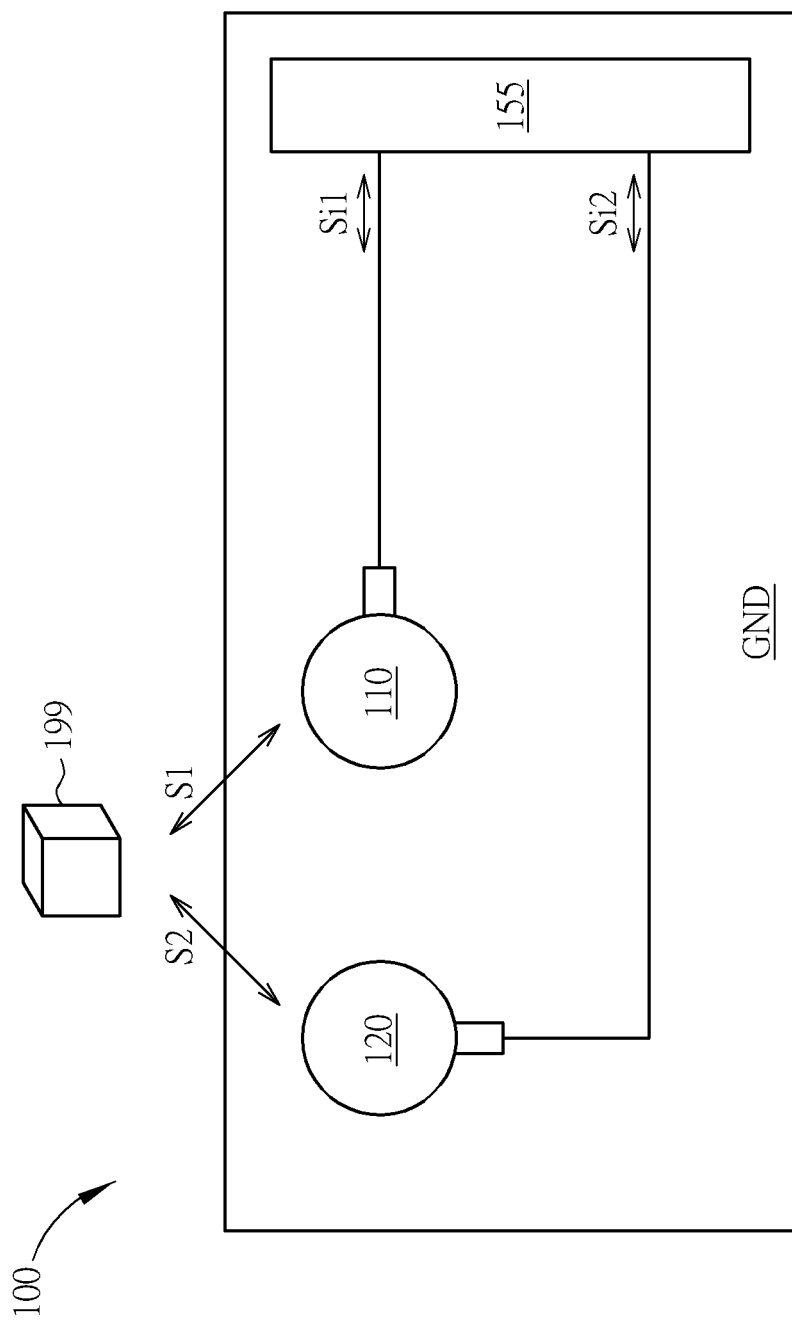
FIG. 11 illustrates that the first antenna and the second antenna have a circular shape according to an embodiment.

According to embodiments, each of the abovementioned antennas 110 to 180 (described in FIG. 1 to FIG. 8), 711 to 71N (described in FIG. 7 to FIG. 8), 721 to 72K (described in FIG. 7 to FIG. 8), 911 to 912 (described in FIG. 9) and 913 (described in FIG. 10) may be of a circular shape, a rectangular shape, an oval shape or a symmetrical shape which has a centroid. FIG. 11 illustrates that the first antenna 110 and the second antenna 120 have a circular shape according to an embodiment. FIG. 11 merely provides an example. In an embodiment, each of the abovementioned antennas of the Doppler motion sensor device could be a planar antenna.

Figure 12:
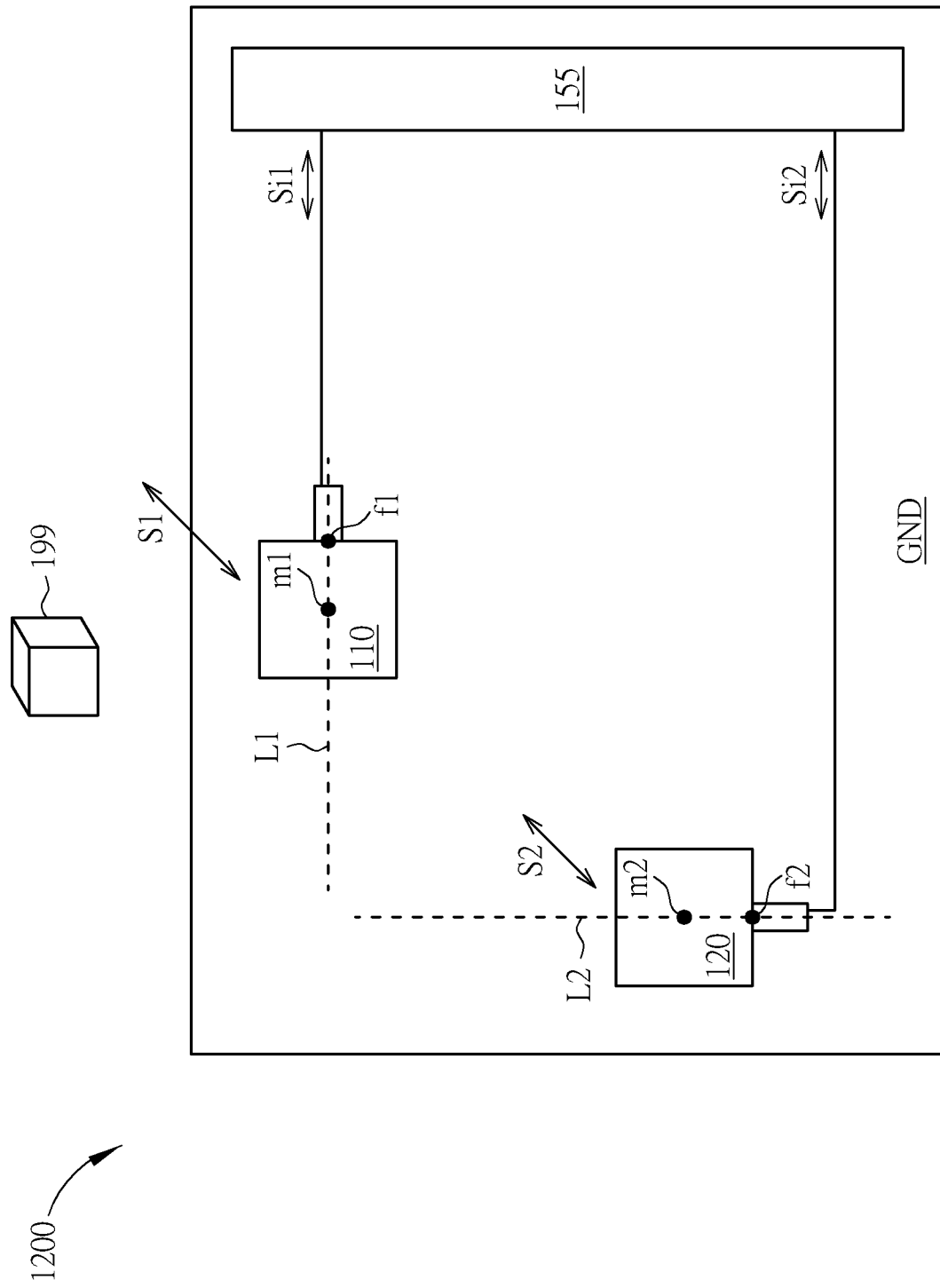
FIG. 12 illustrates a Doppler motion sensor device according to another embodiment.

FIG. 12 illustrates a Doppler motion sensor device 1200 according to another embodiment. The Doppler motion sensor device 1200 may be similar to the Doppler motion sensor device 100 shown in FIG. 1 However, as shown FIG. 1, the first straight line L1 may pass through the second middle point m2 of the second antenna 120, and as shown in FIG. 12, the first straight line L1 may not pass through the second antenna 120. When the first straight line L1 does not pass through the second antenna 120 as shown in FIG. 12, the isolation between the first antenna 110 and the second antenna 120 may be sufficient.

Figure 13:
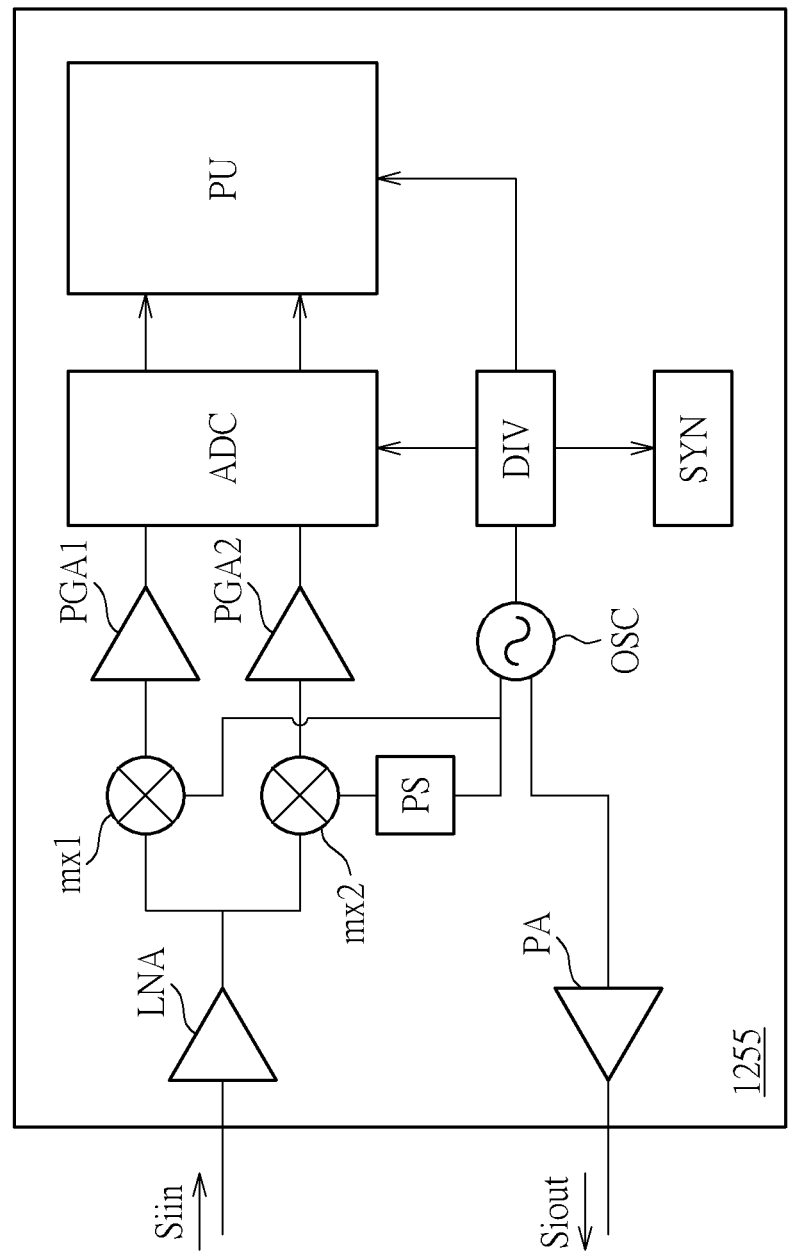
FIG. 13 illustrates a sensor circuit according to an embodiment.

FIG. 13 illustrates a sensor circuit 1255 according to an embodiment. The sensor circuit 1255 may correspond to the sensor circuits 155, 755 and 955 of FIG. 1 to FIG. 12. FIG. 13 may provide a block diagram of the sensor circuit 1255.

However, the structure shown in FIG. 13 is merely an example instead of limiting the structure of the sensor circuit of an embodiment. As shown in FIG. 13, the sensor circuit 1255 may include a low noise amplifier LNA, a power amplifier PA, mixers MX1 and MX2, a phase shifter PS, an oscillator OSC, programmable-gain amplifiers PGA1 and PGA2, an analog-to-digital converter ADC, a frequency divider DIV, a synthesizer SYN, and a processing unit PU. An inputted signal Siin may be corresponding to the internal signal (s) inputted to the sensor circuit described above, and an outputted signal Siout may be corresponding to the internal signal(s) outputted from the sensor circuit described above. The couplings of the components of the sensor circuit 1255 may be as shown in FIG. 13. The processing unit PU may receive the outputted signals from the analog-to-digital converter ADC and the frequency divider DIV to detect the motion of the abovementioned object 199 accordingly. According to embodiment, the sensor circuit 1255 may be implemented in an integrated circuit (IC).

According to embodiments, the abovementioned antennas 110 to 180 (described in FIG. 1 to FIG. 8 and FIG. 11 to FIG. 12), 711 to 71N (described in FIG. 7 to FIG. 8), 721 to 72K (described in FIG. 7 to FIG. 8), 911 to 912 (described in FIG. 9) and 913 (described in FIG. 10) may be used in a object sensing device, such as a FMCW (Frequency Modulated Continuous Wave) object sensing device, for detecting the existence of an still object 199 by analyzing the corresponding internal signals with the sensor circuits. In this embodiment, the sensor circuits 155, 755 and 955 of FIG. 1 to FIG. 12 is provided so that the wireless signals S1~S8, S11~S1$n$, S21~S2K, and S91~S93 which were transmitted by the corresponding antennas could be Frequency Modulated Continuous Wave, and the frequency of the wireless signals could be changed over time.

In summary, by means of Doppler motion sensor devices provided by embodiments, a plurality of antennas may be disposed close to one another and be coupled to the same common voltage plane, and a sensor circuit may be coupled to the same common voltage plane. High isolation among antennas can be achieved, and unwanted interference caused by the polarizations of the antennas can be avoided. Hence, the problems in the field can be well reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Doppler motion sensor device for detecting a motion of an object, comprising:
   a first antenna configured to transmit or receive a first wireless signal, comprising:
      a first middle point at a centroid of the first antenna; and
      a first feed-in point coupled to a sensor circuit and configured to access a first internal signal corresponding to the first wireless signal; and
   a second antenna configured to transmit or receive a second wireless signal, comprising:
      a second middle point at a centroid of the second antenna; and
      a second feed-in point coupled to the sensor circuit and configured to access a second internal signal corresponding to the second wireless signal;
   wherein a first straight line passing through the first feed-in point and the first middle point is orthogonal to a second straight line passing through the second feed-in point and the second middle point, one of the first wireless signal and the second wireless signal is a transmission signal, the transmission signal is reflected by the object to form another one of the first wireless signal and the second wireless signal, the sensor circuit is configured to detect the motion of the object according to at least the first internal signal and the second internal signal, and a frequency of the first wireless signal is similar to a frequency of the second wireless signal.

2. The Doppler motion sensor device of claim 1, wherein the first straight line does not pass through the second antenna.

3. The Doppler motion sensor device of claim 1, wherein the first straight line further passes through the second middle point.

4. The Doppler motion sensor device of claim 1, wherein the first antenna is configured to transmit the first wireless signal, and the second antenna is configured to receive the second wireless signal simultaneously; or wherein the first antenna is configured to receive the first wireless signal, and the second antenna is configured to transmit the second wireless signal simultaneously.

5. The Doppler motion sensor device of claim 1, further comprising:
   a common voltage plane coupled to the first antenna and the second antenna and configured to provide a common voltage, and the common voltage plane is further coupled to the sensor circuit.

6. The Doppler motion sensor device of claim 1, wherein wavelengths of the first wireless signal and the second wireless signal are $\lambda$, and a distance between the first antenna and the second antenna is between $\lambda/16$ and $3\lambda$.

7. The Doppler motion sensor device of claim 1, wherein each of the first antenna and the second antenna comprises a circular shape or a rectangular shape.

8. The Doppler motion sensor device of claim 1,
   wherein the first antenna and the second antenna are formed on an antenna layer, a common voltage plane is formed on a common layer, a substrate is formed on an insulation layer disposed between the antenna layer and the common layer, and the common voltage plane is coupled to the first antenna and the second antenna and configured to provide a common voltage.

9. The Doppler motion sensor device of claim 1, further comprising:
   a third antenna configured to transmit or receive a third wireless signal and comprising:
      a third middle point at a centroid of the third antenna; and
      a third feed-in point coupled to the sensor circuit and configured to access a third internal signal corresponding to the third wireless signal;
   wherein a third straight line passing through the third middle point and the third feed-in point passes through the first middle point, and the second middle point and is orthogonal to the second straight line.

10. The Doppler motion sensor device of claim 9, wherein the first antenna is configured to transmit the first wireless signal, the second antenna is configured to receive the second wireless signal, and the third antenna is configured to transmit the third wireless signal simultaneously; or wherein the first antenna is configured to receive the first wireless signal, the second antenna is configured to transmit the second wireless signal, and the third antenna is configured to receive the third wireless signal simultaneously.

11. The Doppler motion sensor device of claim 9, further comprising:
 a fourth antenna configured to transmit or receive a fourth wireless signal and comprising:
  a fourth middle point at a centroid of the fourth antenna; and
  a fourth feed-in point coupled to the sensor circuit and configured to access a fourth internal signal corresponding to the fourth wireless signal;
 wherein the third straight line further passes through the fourth middle point and is further orthogonal to a fourth straight line passing through the fourth middle point and the fourth feed-in point.

12. The Doppler motion sensor device of claim 11, wherein the first antenna is configured to transmit the first wireless signal, the second antenna is configured to receive the second wireless signal, the third antenna is configured to transmit the third wireless signal, and the fourth antenna is configured to receive the fourth wireless signal simultaneously; or wherein the first antenna is configured to receive the first wireless signal, the second antenna is configured to transmit the second wireless signal, the third antenna is configured to receive the third wireless signal, and the fourth antenna is configured to transmit the fourth wireless signal simultaneously.

13. The Doppler motion sensor device of claim 1, further comprising:
 a fifth antenna configured to transmit or receive a fifth wireless signal and comprising:
  a fifth middle point at a centroid of the fifth antenna; and
  a fifth feed-in point coupled to the sensor circuit and configured to access a fifth internal signal corresponding to the fifth wireless signal;
 wherein a fifth straight line passing through the fifth middle point and the fifth feed-in point passes through the second middle point and is orthogonal to the first straight line.

14. The Doppler motion sensor device of claim 13, wherein the first antenna is configured to transmit the first wireless signal, the second antenna is configured to receive the second wireless signal, and the fifth antenna is configured to receive the fifth wireless signal simultaneously; or wherein the first antenna is configured to receive the first wireless signal, the second antenna is configured to transmit the second wireless signal, and the fifth antenna is configured to transmit the fifth wireless signal simultaneously.

15. The Doppler motion sensor device of claim 13, further comprising:
 a sixth antenna configured to transmit or receive a sixth wireless signal and comprising:
  a sixth middle point at a centroid of the sixth antenna; and
  a sixth feed-in point coupled to the sensor circuit and configured to access a sixth internal signal corresponding to the six wireless signal;
 wherein a sixth straight line passing through the sixth middle point and the sixth feed-in point passes through the fifth middle point and is orthogonal to the fifth straight line.

16. The Doppler motion sensor device of claim 15, wherein the first antenna is configured to transmit the first wireless signal, the second antenna is configured to receive the second wireless signal, the fifth antenna is configured to receive the fifth wireless signal, and the sixth antenna is configured to transmit the sixth wireless signal simultaneously; or wherein the first antenna is configured to receive the first wireless signal, the second antenna is configured to transmit the second wireless signal, the fifth antenna is configured to transmit the fifth wireless signal, and the sixth antenna is configured to receive the sixth wireless signal simultaneously.

17. A Doppler motion sensor device for detecting a motion of an object, comprising:
 N first antennas configured to transmit or receive N first wireless signals, wherein an $n^{th}$ first antenna of the N first antennas is configured to transmit or receive an $n^{th}$ first wireless signal, the $n^{th}$ first antenna comprises an $n^{th}$ first middle point and an $n^{th}$ first feed-in point, the $n^{th}$ first middle point is at a centroid of the $n^{th}$ first antenna, the $n^{th}$ first feed-in point is coupled to a sensor circuit and configured to access an $n^{th}$ first internal signal corresponding to the $n^{th}$ first wireless signal; and
 K second antennas configured to transmit or receive K second wireless signals, wherein a $k^{th}$ second antenna of the K second antennas is configured to transmit or receive a $k^{th}$ second wireless signal, the $k^{th}$ second antenna comprises a $k^{th}$ second middle point and a $k^{th}$ second feed-in point, the $k^{th}$ second middle point is at a centroid of the $k^{th}$ second antenna, the $k^{th}$ second feed-in point is coupled to the sensor circuit and is configured to access a $k^{th}$ second internal signal corresponding to the $k^{th}$ second wireless signal;
 wherein an $n^{th}$ first straight line passing through the $n^{th}$ first middle point and the $n^{th}$ first feed-in point is orthogonal to a $k^{th}$ second straight line passing through the $k^{th}$ second middle point and the $k^{th}$ second feed-in point, N first middle points of the N first antennas form a geometric shape, the $k^{th}$ second straight line passes through a centroid of the geometric shape, the sensor circuit is configured to detect the motion of the object according to the N first internal signals and the K second internal signals, N, n, K and k are positive integers, $0<n\leq N$, and $0<k\leq K$.

18. The Doppler motion sensor device of claim 17, wherein the N first antennas are configured to receive the N first wireless signals and the K second antennas are configured to transmit the K second wireless signals simultaneously, and the K second wireless signals are reflected by the object to form the N first wireless signals; or wherein the N first antennas are configured to transmit the N first wireless signals and the K second antennas are configured to receive the K second wireless signals simultaneously, and the N first wireless signals are reflected by the object to form the K second wireless signals.

19. A Doppler motion sensor device for detecting a motion of an object, comprising:
 a first antenna configured to transmit or receive a first wireless signal, comprising:
  a first middle point at a centroid of the first antenna; and
  a first feed-in point coupled to a sensor circuit and configured to access a first internal signal corresponding to the first wireless signal; and
 a second antenna configured to transmit or receive a second wireless signal, comprising:
  a second middle point at a centroid of the second antenna; and
  a second feed-in point coupled to the sensor circuit and configured to access a second internal signal corresponding to the second wireless signal;
 wherein the first antenna is on a first plane, the second antenna is on a second plane, the first plane and the second plane are orthogonal, one of the first wireless signal and the second wireless signal is a transmission signal, the transmission signal is reflected by the object to form another one of the first wireless signal and the second wireless signal, the sensor circuit is configured to detect the motion of the object according to at least the first internal signal and the second internal signal, and a frequency of the first wireless signal is similar to a frequency of the second wireless signal.

20. The Doppler motion sensor device of claim 19, further comprising:
  a third antenna configured to transmit or receive a third wireless signal, comprising:
    a third middle point at a centroid of the third antenna; and
    a third feed-in point coupled to the sensor circuit and configured to access a third internal signal corresponding to the third wireless signal;
  wherein the third antenna is on a third plane, the third plane is orthogonal to the second plane, and the first plane and the third plane are coplanar or in parallel with one another.

* * * * *